March 23, 1965  D. POST  3,174,920
METHOD FOR PRODUCING ELECTRICAL RESISTANCE
STRAIN GAGES BY ELECTROPOLISHING
Filed June 9, 1961  2 Sheets-Sheet 1

INVENTOR
Daniel Post

BY  Karl W. Flocks
ATTORNEY

March 23, 1965 D. POST 3,174,920
METHOD FOR PRODUCING ELECTRICAL RESISTANCE
STRAIN GAGES BY ELECTROPOLISHING
Filed June 9, 1961 2 Sheets-Sheet 2

INVENTOR
Daniel Post

BY  KARL W. FLOCKS
ATTORNEY

United States Patent Office 3,174,920
Patented Mar. 23, 1965

3,174,920
METHOD FOR PRODUCING ELECTRICAL RESISTANCE STRAIN GAGES BY ELECTROPOLISHING
Daniel Post, P.O. Box 408, Averill Park, N.Y.
Filed June 9, 1961, Ser. No. 116,097
6 Claims. (Cl. 204—143)

The present invention relates to electrical resistance strain gages, resistance elements for temperature sensing devices, other resistance elements and similarly fabricated devices and components, and more particularly to the fabrication of such devices wherein gages and parts of superior quality are produced.

Electrical strain gages are used widely in experimental stress analysis for investigating the behavior of structural parts under loads and also in a large variety of transducers for measuring forces, pressures, torques, etc. The strain gage is bonded to the surface of the structural part or transducer element which will deform in response to the applied forces. The deformation is transmitted by the bonding agent to the strain gage which thus experiences a change of geometry related to the local state of strain and stress.

The strain gage itself is a metal filament usually wrapped back and forth in the form of a grid. When acting in a region of tensile or extensional strain, for example, the filament increases in length, decreases in cross-sectional area and increases in specific resistivity. Consequently, the electrical resistance of the filament increases in proportion to the strain. This change of resistance is measured and the strain in the underlying material is calculated.

Performance of a general purpose electrical resistance strain gage is enhanced as the dimensions of the active portion of the gage are reduced and the electrical resistance is increased. However, these properties are antithetical, since a conducting filament of substantial length is required to develop high electrical resistance. Consequently, optimum properties are achieved when a long filament of minimum width and thickness is produced in the configuration of a grid of maximum compactness.

Minimum gage size is definitely a desired characteristic. Strain gages are most often used on structural parts in which the strains vary from point to point along the part. While it is desired to determine the strain at one or more specific points on the part, a gage of finite size measures the average strain in the area covered by the gage. This average strain approaches the true value at the central point as the gage area approaches zero. Minimum size is always desirable, but it is essential for measurements in zones of high strain gradients. Significantly, those problems involving high strain gradients are usually the most critical problems from the standpoint of structural integrity.

In the present state of the art, maximum compactness of rationally designed strain gages is achieved by photoetching thin metallic foil into the form of a grid, as distinct from the original process in which fine wire filaments were wound or wrapped into a grid configuration. For the photo-etched gage, minimization of filament width is limited by the raggedness of the edges of the etched filament and compactness is limited by the amount of space between adjacent filaments required by virtue of the production process.

Accordingly, the new method of the present invention yields filament edges with far less raggedness than those currently produced by conventional photo-etching methods.

In addition, the new method is inherently suitable for minimization of the space between adjacent filaments and the design and production of gages with very small filament widths with maximum compactness of the active portion of the strain gage as a whole.

Furthermore, the new method offers an inherent advantage of reproducibility which enhances the ease of producing large quantities of gages of uniformly high quality.

Basically, the present invention provides a novel and improved method of producing electrical resistance strain gages by an electropolishing process used in conjunction with an insulating mask.

These, as well as further advantages which are inherent in the invention, will become apparent from the following description of the new process, reference being made to the accompanying drawings wherein.

Figure 5:
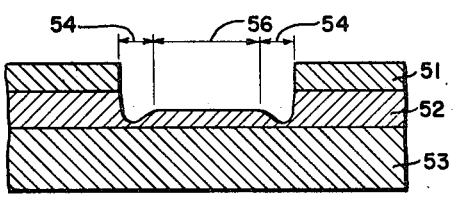
Figure 6:
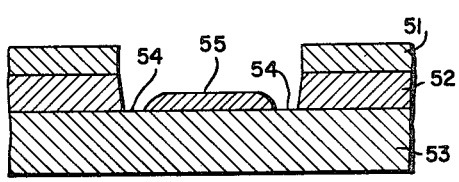
Figure 7:
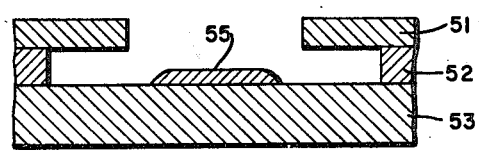
Figure 8:
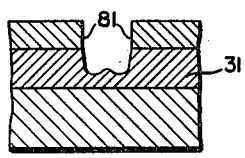
Figure 9:
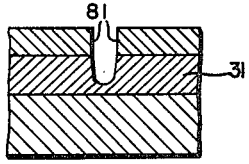
Figure 10:
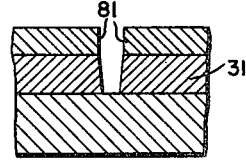
Figure 11:
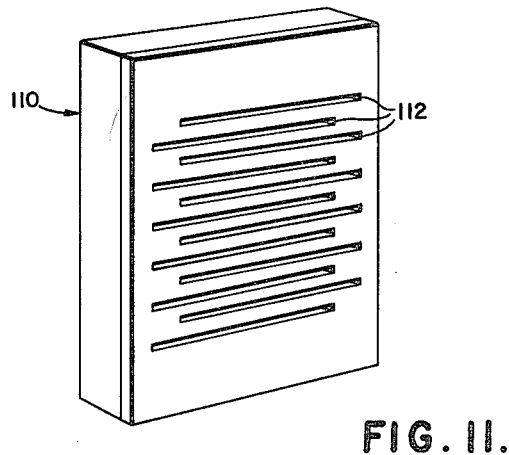
Figure 12:
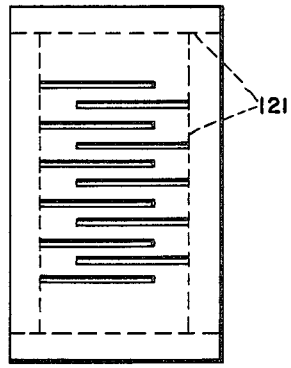

FIGS. 5, 6, and 7 show expanded thickness scale views of a wide slot being formed by electropolishing;

FIGS. 8, 9 and 10 show expanded thickness scale views of slots being formed by the method of this invention;

FIG. 11 shows an enlarged view of a form of a simple strain gage after the electropolishing process; and FIG. 12 shows the lines along which trimming takes place to produce a finished gage from the form shown in FIG. 11.

Figure 1:
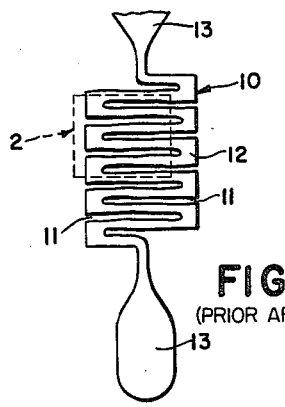
FIG. 1 shows an enlarged form of a foil type commercial electrical resistance strain gage.
Figure 3:
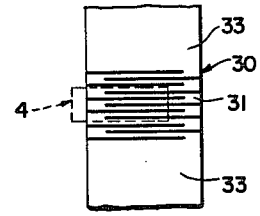
FIG. 3 shows an enlarged form of a foil type electrical resistance strain gage produced by the method of this invention.
Figure 2:
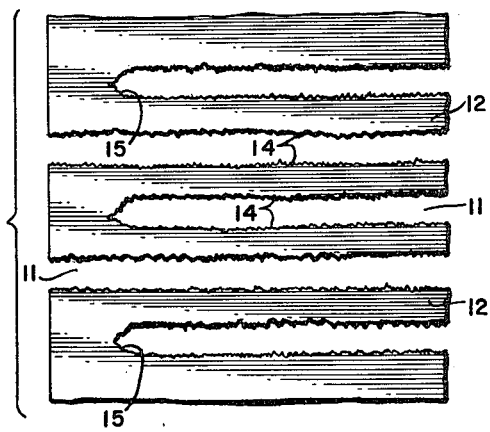
FIG. 2 shows a greatly magnified view of part of the commercial strain gage illustrated in FIG. 1.
Figure 4:
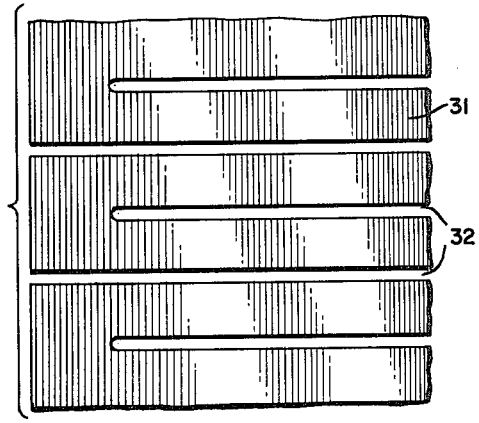
FIG. 4 shows a greatly magnified view of part of the foil type electrical resistance strain gage illustrated in FIG. 3.

A representative gage 10 produced by the conventional processes of the prior art is illustrated in FIG. 1. This gage 10 is formed from a metal foil by a chemical etching process. Foil has been removed from the areas forming slots 11 and leaving foil to form filaments 12 and connection terminals 13. Section 2 in FIG. 1 is shown enlarged in FIG. 2. In this view the raggedness that is characteristic of the conventional processes of the prior art can readily be seen. Filaments 12 exhibit severe raggedness in comparison to those produced by the method of the present invention and illustrated in FIGS. 3 and 4. In addition to the gross irregularities along parallel edges 14, several sharp notches are present in the loops 15. The random character of these irregularities plays a predominate role in the design of compact strain gages. For consistent manufacture, the width of filaments 12 and of slots 11 should be many times the size of the irregularities. Therefore, at present the smallest electrical resistance strain gage available commercially and formed by prior art methods is designed at or beyond the practical limits of compactness with a very high rejection rate during the production of that size gage.

In contrast, the smoothness of the filaments 31 of gage 30 formed by the method of this invention allows a substantial decrease in the filament width, and a significant decrease in the width of slots 32. Not only are the filaments closer together, but the electrical resistance per unit filament length increases in proportion to the decreased width, thus permitting a smaller overall length of filament 31 and gage 30.

In the method of this invention an electropolishing process is used in conjunction with an insulating mask. The insulating mask is arranged so as to make full use of the increased rate of metal dissolution or predominate or preferential attack adjacent to the mask boundaries.

Preferential attack as discussed in the specification is illustrated in FIGS. 5, 6 and 7. A resist masking material 51 applied on the surface of a metallic foil 52, such as for example constantan foil (55% copper, 45% nickel), previously laminated to a suitable dielectric backing material 53, is shown. The enlarged thickness cross-sectional area shown for illustrative purposes is a cross-section of an unprotected rectangular area thereby exposing a comparatively large area between the edges of the masking material 51 to electropolishing action. As illustrated in an intermediate stage in FIG. 5, the electropolishing action predominates along the edges of the insulating mask 51, causing an increased rate of material removal in a highly localized zone 54 along the edge of mask 51 and a region of uniform electropolishing action 56 in the area not immediately adjacent to the edges of mask 51. In addition to the increased rate of penetration, it is significant also that the selective behavior of this electropolishing process produces slot edges of excellent fidelity, essentially free of the raggedness that is characteristic of the conventional processes of the prior art.

Referring again to FIG. 5, the width of localized zone 54 depends upon the polishing potential. It is my best understanding that a transition phase exists between the area over the mask and the electrolyte in the area over the conducting material which is remote from the margin of the mask and if the film which is formed in the electrolyte under electropolishing conditions is considered to be a normal film or layer, then the film or layer within the aforementioned transition stage is neither the same as that over the masked area or as that over the remote area but is a modified film or layer having a modified electrical resistance. The zone of preferential attack 54 is much narrower with fast electropolishing (e.g. 6 volts for constantan in phosphoric acid electrolyte) than in the case of slow electropolishing (e.g. 1 volt). In fact, for any suitable combination of metallic base material, electrolyte, and potential, the extent of the region of predominate electropolishing action can be ascertained without ambiguity. Thus the critical point defining the distance between adjacent mask boundaries at which new and beneficial action is developed in keeping with the novel process of this invention is that unique point at which the zones of predominate electropolishing action just begin to overlap. After further exposure to electropolishing action the foil 52 along the boundaries of mask 51 is cut through to full depth in zone 54 as illustrated in FIG. 6. Even after a comparatively long period of subsequent processing the island 55 within the boundaries of mask 51 remains. Once an island 55 is fully formed there is no low resistance conducting path to that region and subsequent effect on the island is practically zero, but continued attack results in undercutting beneath the mask 51 as shown in FIG. 7.

The fact that the rate of penetration is greater along the edges of the mask is utilized in the method of this invention. The main features of this method are achieved when the adjacent mask edges 81 are brought together until the adjacent regions of predominate electropolishing action are partially or completely overlapped, as indicated in FIGS. 8 and 9, respectively, for a stage of incomplete penetration, and in FIG. 10 for full penetration without leaving an island 55 as in FIG. 6. Since no wide areas of metallic foil are removed, the entire electropolishing action is localized along the lines that define the configuration of the filament of strain gage 30. In this way, a compact continuous filament 31 is formed in the foil.

The electropolishing process produces smoother slot edges than etching. This is believed to take place since electropolishing conditions are established by the development of a surface film on the workpiece and a viscous layer in the adjacent electrolyte as discussed by W. J. McG. Tegart, The Electrolytical and Chemical Polishing of Metals, Pergamon Press, N.Y., 1959.

This film and viscous layer account for most of the electrical resistance near the workpiece and thus control the local current density in the workpiece. Current density is highest at elevated points in the workpiece and therefore peaks are attacked more rapidly than the surrounding metal and the surface becomes progressively smoother during the electropolishing process. Further improvement in the smoothness of slot edges, when zones of predominate attack are overlapped, is assumed to result from modification of the surface film, the viscous layer, or both, such as to enhance this smoothing effect.

The new process is typified by the following procedure which may be varied without departing from the essence of the invention.

A mask material approximating the shape of the gage to be produced is applied to metallic foil which has previously been laminated to a suitable dielectric backing material. This mask must be designed so that the width of any slot to be formed in the subsequent electropolishing operation is so small that regions of predominate electropolishing activity will overlap, as discussed above. Although this may be done in any of several ways, one method is as follows.

First, an image of the gage configuration is produced on a transparent base as opaque lines. This image is usually produced as a photographic reduction of a large black and white chart. The opaque lines will represent spaces between adjacent grid filaments and may also represent boundary lines defining the width of the gage. Next, a thin coating of a photo-sensitive resist mask material is applied to the metallic foil mounted on the backing material. The gage image is then pressed against the coated foil and illuminated by a light source. The resist mask on the foil is placed in a developer solution which dissolves or removes the mask material in regions not exposed to the light, and thus lines defining the gage configuration are produced in the coating as the absence of mask material. The remaining mask material acts as an electrical insulation and as a protective mask that inhibits attack on the foil during the electropolishing process.

For the next step in the process an insulated wire is attached to the metallic foil in a region outside the gage area and the masked foil is placed in an electropolishing solution and connected in series with a direct current source and an appropriate electrode in the solution, such as stainless steel or material of the metallic foil. An electrolyte that can be used in this electropolishing process when applied to constantan foil (55% copper, 45% nickel) is 85% phosphoric acid. With this electrolyte, a potential across the electrolytic cell of 1 volt has been found satisfactory for producing strain gages of constantan foil. Under these conditions and utilizing a mask illustrated in section in FIG. 10, but corresponding in plan to the gages shown in FIGS. 4, 11 and 12, I have found that a distance of approximately in the order of .00025" between the adjacent mask edges brings about a partial or complete overlapping of the adjacent regions of predominate electropolishing action and that the article produced appears in section to correspond to FIG. 10 of the drawings and that the walls of the crevice formed are relatively smooth.

After the foil material is removed along lines defining the configuration of the strain gage the part is removed from solution, washed and dried. One form of a simple strain gage may appear as part 110 of FIG. 11. Such parts have slots 112 from which the metal has been removed. The excess foil is then trimmed along trim lines 121 as shown in FIG. 12. The gage may be isolated by cutting the foil or the entire lamination along the trim lines 121. Alternatively, the excess foil may be removed by a subsequent electropolishing or by a subsequent chemical-etching process involving the application of a new mask to protect the filament from further attack. Concentrated ferric chloride solution applied by spray or splash techniques can be used effectively as a chemical etching process.

The process described above illustrates the basic steps for production of a strain gage. Introduction of additional steps and substitution or modification of those given here are recognized as production details that vary with the production rate. backing material, foil material, mask material, the particular configuration under consideration and related factors; such details as cleanliness procedures, mechanical fixtures and trimming method are among those that may be included. It is also recognized that devices other than electrical resistance strain gages may be manufactured in whole or in part, by the method disclosed here, and that such devices fall into the realm of this specification.

It should be noted that in the process described and in keeping with the invention described herein the slots formed in the metallic foil are very narrow with the parallel edges of the masking material forming the slots positioned extremely close to each other. The adjacent mask edges are therefore in a position to cause the partial or complete overlapping of regions of predominate electropolishing action. This then forms the narrow and smooth slots and the fine filaments necessary for a compact strain gage produced by the method of this invention. The same advantages are accrued for other geometrical shapes, for example, circular and non-circular holes, as long as the regions of predominate electropolishing activity associated with nearby boundaries are overlapped or superimposed.

Gages produced by the new process are also free of deleterious sharp notches commonly found in commonly produced gages. Such defects are formed by preferential chemical attack on discrete elongated crystals that occur in the foil by virtue of the rolling process employed to manufacture the foil. Such notches exhibit a symmetry with respect to the direction of rolling, and are particularly troublesome for compound or special gages having non-parallel grids. In contrast, gages can be electropolished by the new process without influence of the directional properties of the foil, thus permitting greater flexibility in gage design.

Also, it is apparent that where special configurations or circumstances indicate its desirability, the new process may be employed in simultaneous or successive combination with a chemical etching process.

Since the electrolyte has no deleterious effect on the electrically insulating mask, extremely thin masks can be employed successfully. Thicknesses as small as 5 millionths of an inch have been used, and this does not appear to be a lower limit. When a photosensitive coating is used for masking purposes, the extreme thinness of the coating permits transfer of the gage image with unprecedented fidelity.

Also, the overlapping preferential attack of the metal along boundaries of the mask produces relatively smooth filament edges that faithfully reproduce the desired gage configuration. It is apparent that this freedom from raggedness permitts small filament width in the design of gages with the resultant advantage of high electrical resistance per unit filament length.

Accordingly, it is clear that the potential of this new process far exceeds the potential of the present commercial methods for producing gases of minimum size. In addition, freedom from random irregularities enhances reproducibility, and the new process is better suited to quantity production of uniformly high quality gages and similar type devices.

From the foregoing, varied application of the novel aspects of the invention will occur to those skilled in the art, and variations in matters of detail will be apparent; and therefore it is appropriate that the appended claims be accorded a latitude of interpretation, consistent with the spirit and scope of the invention.

What is claimed is:

1. A process for producing electrical resistance strain gages and similarly fabricated devices and components which comprises covering a sheet of conducting material with an electrically insulating mask having open portions and shaped boundaries in a predetermined configuration in which closely spaced adjacent portions are spaced from each other a distance not more than twice the distance of the width of the zone of predominate attack which initially occurs contiguous to said boundaries and which would be produced in said conducting material in an electropolishing operation involving the formation of a resistive film, exposing said conducting material to electrolytic attack under electropolishing conditions, which normally form a resistive film within the electrolyte when masking margins are relatively widely spaced from each other, to form a modified resistitve film immediately over the conducting material in the area exposed between said closely spaced adjacent portions of the said insulating mask, and removing said conducting material in unmasked regions through the action of said anodic electrolytic attack to from recesses having relatively smooth walls.

2. The process of claim 1 in which the conducting material is a thin metal sheet.

3. The process of claim 1 further characterized by said anodic electrolytic attack continuing for a complete penetration of the thickness of said conducting material.

4. The process in accordance with claim 1 wherein the cathode in the electrolyte is stainless steel.

5. The process in accordance with claim 1 wherein the said conducting material under anodic attack is constantan and the electrolyte includes phosphoric acid.

6. The process in accordance with claim 5 wherein the voltage applied to effect the said anodic electrolytic attack is about in the order of 1 to 6 volts.

References Cited by the Examiner

UNITED STATES PATENTS

| | | | |
|---|---|---|---|
| 378,423 | 2/88 | Baynes | 204—143 |
| 2,421,607 | 6/47 | Fowler | 156—16 |
| 2,432,800 | 12/47 | Reichold | 204—143 |
| 2,469,689 | 5/49 | Gresham | 204—143 |
| 2,607,825 | 8/52 | Eisler | 204—143 |
| 2,693,023 | 11/54 | Kerridge | 156—8 |
| 2,758,074 | 8/56 | Black | 204—143 |
| 2,784,155 | 3/57 | Heinrich | 204—143 |
| 2,842,464 | 7/58 | Dickinson | 156—8 |
| 2,885,524 | 5/59 | Eisler | 156—8 |
| 2,969,732 | 1/61 | Kendall | 204—143 |

FOREIGN PATENTS

| | | |
|---|---|---|
| 855,138 | 11/60 | Great Britain. |
| 962,702 | 6/50 | France. |

JOHN H. MACK, *Primary Examiner.*

WINSTON A. DOUGLAS, *Examiner.*